United States Patent
Vogt et al.

(10) Patent No.: US 9,468,992 B2
(45) Date of Patent: Oct. 18, 2016

(54) METHOD AND DEVICE FOR MACHINING NON-ROTATIONALLY SYMMETRICAL WORKPIECES BY MEANS OF LASER BEAM

(71) Applicant: JENOPTIK Automatisierungstechnik GmbH, Jena (DE)

(72) Inventors: Stefan Vogt, Jena (DE); Thomas Doering, Sulza (DE); Pierre Geipel, Gera (DE); Robert Michel-Triller, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 28 days.

(21) Appl. No.: 14/429,527

(22) PCT Filed: Sep. 26, 2013

(86) PCT No.: PCT/EP2013/002883
§ 371 (c)(1),
(2) Date: Mar. 19, 2015

(87) PCT Pub. No.: WO2014/048567
PCT Pub. Date: Apr. 3, 2014

(65) Prior Publication Data
US 2015/0231737 A1 Aug. 20, 2015

(30) Foreign Application Priority Data
Sep. 28, 2012 (DE) .................. 10 2012 109 245

(51) Int. Cl.
*B23K 26/12* (2014.01)
*B23K 26/70* (2014.01)
(Continued)

(52) U.S. Cl.
CPC ....... *B23K 26/0884* (2013.01); *B23K 26/0861* (2013.01); *B23K 26/38* (2013.01); *B23K 26/70* (2015.10); *B23K 37/04* (2013.01);
(Continued)

(58) Field of Classification Search
CPC ...... B23K 26/12; B23K 26/70; B23K 37/00; B23K 37/04; B23Q 7/04
USPC ............... 219/121.67, 121.72, 161
See application file for complete search history.

(56) References Cited

U.S. PATENT DOCUMENTS 4,563,567 A * 1/1986 Geffroy .............. B23K 26/0884
219/121.78
4,779,436 A 10/1988 Schwarze
(Continued)

FOREIGN PATENT DOCUMENTS

CN 102091865 A 6/2011
CN 102189335 A 9/2011
(Continued)

*Primary Examiner* — Samuel M Heinrich
(74) *Attorney, Agent, or Firm* — Duane Morris LLP

(57) ABSTRACT

A device and a method for machining workpieces (5, 6) by means of a laser beam. Said device has a delivery means (3) for delivering the workpieces (5,6) to a first machining position (8.1) and a machining means (2) which has at least one machining head (2.1) for machining of a workpiece (5,6) delivered to the first machining position (8.1). The delivery means (3) is a gripping robot with a gripping device (3.2). At least one clamping means (9,10) is disposed in order to accommodate a workpiece (5,6) delivered by the delivery means (3), wherein respective machining position is defined by each clamping means (9,10). The machining head (2.1) can be delivered to each machining position for machining of the workpieces (5,6).

5 Claims, 3 Drawing Sheets

(51) Int. Cl.
  *B23K 37/00* (2006.01)
  *B23K 37/04* (2006.01)
  *B23Q 7/04* (2006.01)
  *B23K 26/08* (2014.01)
  *B23K 26/38* (2014.01)
(52) U.S. Cl.
  CPC ............. *B23K37/0443* (2013.01); *B23Q 7/04* (2013.01); *B23K 26/12* (2013.01); *B23K 37/00* (2013.01)

(56) References Cited

U.S. PATENT DOCUMENTS 5,231,264 A * 7/1993 Fujita .................... B23K 26/10
                                                        219/121.78

| | | |
|---|---|---|
| 6,335,508 B1 | 1/2002 | Nam |
| 2009/0249606 A1 | 10/2009 | Diez et al. |
| 2011/0143027 A1 | 6/2011 | Simmons |
| 2011/0220625 A1 | 9/2011 | Pluss |
| 2012/0205355 A1 | 8/2012 | Munzer et al. |

FOREIGN PATENT DOCUMENTS

| | | |
|---|---|---|
| CN | 102470487 A | 5/2012 |
| DE | 36 19 643 A1 | 1/1987 |
| DE | 198 14 272 A1 | 10/1999 |
| JP | S63 56386 A | 3/1988 |
| JP | H03 216286 A | 9/1991 |
| JP | 2003 046009 A | 2/2003 |
| JP | 2010 221251 A | 10/2010 |
| WO | WO 2013/030328 A1 | 3/2013 |

* cited by examiner

METHOD AND DEVICE FOR MACHINING NON-ROTATIONALLY SYMMETRICAL WORKPIECES BY MEANS OF LASER BEAM

RELATED APPLICATIONS

The present application is a U.S. National Stage application of International PCT Application No. PCT/EP2013/002883 filed on Sep. 26, 2013 which claims priority benefit of German Application No. DE 10 2012 109 245.1 filed on Sep. 28, 2012, the contents of each are incorporated by reference in their entirety.

FIELD OF THE INVENTION

The invention relates to a method, which can be used for machining non-rotationally symmetrical workpieces and takes into account special technical requirements for machining non-rotationally symmetrical workpieces. Moreover, the invention relates to a device for machining non-rotationally symmetrical workpieces by means of a laser beam.

BACKGROUND OF THE INVENTION

Solutions for machining workpieces by means of a laser beam have been disclosed in the prior art, of which only patent specification U.S. Pat. No. 6,335,508 B1 is referenced as an example herein. In it, delivery means for pipes are described, which can be used for machining pipes by means of a laser beam. A rotationally symmetrical pipe is retained by means of a plurality of transport devices and transported along its longitudinal axis. An additional controlled rotation of the pipe around its longitudinal axis makes it possible to machine the pipe by means of a laser cutting head using a variety of cutting controls.

Special requirements involving the process control and the design of devices for laser cutting are needed for machining non-rotationally symmetrical workpieces. In order to guide cuts along the proposed machining lines, the exact spatial orientation of the workpiece must be known in addition to the position. While it is for example sufficient to know that the longitudinal center axis of the workpiece is positioned in a specified X-Y plane for machining a rotationally symmetrical workpiece, the additional knowledge of the orientation in the X-Y plane (e.g. orientation of the front or back end of the workpiece) and the orientation of the workpiece in Z-direction is required.

Furthermore, it is known to apply markings to non-rotationally symmetrical workpieces, for example to bent pipes (e.g. DE 36 19 643 A1), to mark the site of an object to be mounted on the pipe later on. In so doing, the marking can be applied during or after the pipe is bent in a bending machine, as long as the pipe is still inside the bending machine and the exact position and the spatial orientation of the bent pipe are therefore known. The application of the marking at a later time is only possible if the pipe was transported across known trackages and with known angles of rotation, and the exact position and hence the spatial orientation of the non-rotationally symmetrical pipe (workpiece) are additionally known. After removing the workpiece from the bending machine, a spatial orientation of the workpiece, and hence e.g. the location and direction of the machining lines, is only possible with the help of complex metrology (e.g. 3D scanners). Therefore, a subsequent further machining of the workpiece is associated with complex time- and compute-intensive determinations of the spatial orientation of the workpiece, as a result of which the required cycle times for machining a single workpiece increase.

SUMMARY OF THE INVENTION

An object of the invention is to propose a possibility for machining non-rotationally symmetrical workpieces, with which low cycle times can be achieved in addition to a low metrological effort.

This object is solved with a device for machining workpieces by means of a laser beam, the device having delivery means for delivering the workpieces to a first machining position and comprising machining means, which have at least one machining head for machining a workpiece delivered to the first machining position. The delivery means include a robot gripper having a gripping device. The machining head is movable by at least three degrees of freedom, and the dispensing means with mountings are arranged in an access area of the delivery means. The design and dimensions of the mountings are selected such that at least one workpiece having a defined spatial orientation and dispensing position, which is retained in the mounting, is provided to the delivery means for removal from the mounting. At least one clamping means is arranged for retaining a workpiece delivered by the delivery means, wherein one machining position is, in each case, defined by each clamping means and the machining head can be delivered to each machining position for machining the workpiece.

In the description at hand, workpieces shall mean materials that are generally being machined, e.g. raw materials such as steel sheets, pipes or profiles as well as semi-finished products and finished products.

In one embodiment, the dispensing means are formed by an arrangement of mountings, which are shaped and arranged such that a workpiece can only be placed into the mountings in a single spatial orientation. Because the position of the mountings is known, the spatial orientation and the dispensing position of a workpiece placed into the mountings are also clearly defined.

The dispensing means can have such a number of mountings as to allow the simultaneous retention of a plurality of workpieces. Moreover, it is possible that the mountings are designed such that different types of workpieces can be retained. The latter embodiment is advantageous for example in the case where one or a plurality of workpieces, which are then likewise supposed to be machined using the device according to the invention, are created by machining a semi-finished product as a first workpiece.

In other embodiments, the mountings can also be designed such that workpieces can be retained, which have not been created from one another as a result of machining steps.

The machining head can be connected with a laser source of the machining means and includes means for guiding and shaping the beam. It can be moved in a controlled manner by motors and a control system. In further embodiments of the device according to the invention, the machining head can be movable by up to six degrees of freedom, namely along the X, Y and Z axes of a Cartesian coordinate system as well as be rotatable around the mentioned axes. The machining head can thus be rotatable and pivotable.

The delivery means, in particular the gripping device, are movable in a controlled manner in six degrees of freedom.

A clamping means can be any means that are suitable for retaining a workpiece. Clamping means can be for example a clamping chuck, conical retainers or other force- and/or form-fitted devices for retaining workpieces. A plurality of clamping means can be arranged in further embodiments of the device according to the invention. Two camping means are provided in a preferred embodiment. One or a plurality of clamping means can be rotatable, i.e., a clamped workpiece is rotatable at least around one axis of the clamping means.

A machining position within the meaning of the description shall mean an area where the workpiece can be machined by the machining head. For example, a workpiece retained in a clamping means can be machined along machining lines of the workpiece.

Advantageously, the first machining position is determined by a defined spatial orientation and position of the gripping device. For example, a workpiece, which is to be machined, e.g. cut off, perforated, drilled or modelled by the machining head along machining lines, can be retained by the gripping device. Said machining lines can indeed be spaced apart from the gripping device, e.g. 20 to 100 cm, but the exact spatial orientation and position of each machining line is also known due to the known spatial orientation and position of the workpiece relative to the gripping device.

Therefore, an advantage of the device according to the invention is that no metrological means are required, by way of which e.g. a spatial orientation of the workpiece can be recorded, controlled and optionally corrected during the delivery or at the machining position.

The device according to the invention has created at least two different machining positions for only one machining head. This makes it possible that the machining head is delivered to a machining position, while a workpiece is delivered to a different machining position by the delivery means.

In an advantageous embodiment of the device, a conveying means can be provided, with which the machined workpieces are transported away. The workpieces can be delivered for subsequent machining outside of the device. But they can also be provided again for further machining by the device.

In a further embodiment of the device, a plurality of delivery means, machining means or clamping means as well as combinations thereof can also be provided. They can be operated in parallel to each other. However, they can also interact in a controlled manner such that e.g. workpieces can be delivered to a plurality or changing clamping means by a delivery means or such that a machining head can be delivered to changing machining positions. The flexibility of the use of the device is increased as a result.

A control system is provided, with which at least the delivery means and the machining means can be activated. It is advantageous, if operating statuses of the delivery means and the machining means are adjusted to each other, in order to ensure a consistently high precision of all movements and processing steps even when the process is conducted over longer periods of time.

The device according to the invention can be used for machining non-rotationally symmetrical workpieces by means of a laser beam.

The object is additionally solved with a method for machining non-rotationally symmetrical workpieces by means of a laser beam. The method comprises the following steps:

a) Provision of a semi-finished product as a first workpiece, having a defined spatial orientation and dispensing position;
b) Gripping of the first workpiece by means of a gripping device of a delivery means;
c) Delivery of the first workpiece to a first machining position by means of the gripping device, wherein the first workpiece is retained freely in space;
d) Delivery of a machining head of a machining means to the first machining position and machining of the first workpiece, wherein the steps c) and d) can be carried out multiple times;
e) Release of the machined first workpiece;
f) Provision of at least one second workpiece in a defined spatial orientation and dispensing position;
g) Gripping of the second workpiece and delivery of the second workpiece to a further machining position by means of the gripping device, wherein the second workpiece is retained at the further machining position by means of a clamping means;
h) Delivery of the machining head to the further machining position and machining of the second workpiece, and
i) Release of the machined second workpiece.

The conduct of steps a) to i) in the order mentioned above is not compulsory. Individual or a plurality of steps can also be repeated once or multiple times, provided this is not contrary to a faultless technical process of the method according to the invention. It is also possible to carry out the steps of the method according to the invention simultaneously, whereby reductions in the cycle times and/or an improvement in the capacity utilization of a device used to carry out the method can be achieved.

Advantageously, the workpieces and the machining head are delivered to the machining positions with a tolerance of less than 0.1 mm.

The method according to the invention is advantageously designed such, that steps h) and i) are also carried out simultaneously with the steps a) to c). This advantageously helps achieve that the second workpieces present in further machining positions are machined and released, while the robot gripper delivers a first workpiece to the first machining position. Said type of process control helps reduce unproductive downtimes of the machining means.

If a plurality of first workpieces are provided in the dispensing means or if step a) is already carried out during one of the steps c) to e), the steps b) and c) can be carried out simultaneously with steps h) and i).

Moreover, it is possible that the steps g) and h) are carried out simultaneously, if at least two further machining positions are provided and the motion sequences of the gripping means and the machining means do not collide. It is then possible that a second workpiece is delivered to a further machining position, while another second workpiece is machined by the machining head at another further machining position.

Furthermore, it is advantageous if step g) is already carried out once prior to the conduct of the method with the repeated steps a) to i), in order to outfit the clamping means already in advance.

BRIEF DESCRIPTION OF THE DRAWINGS

The invention is explained in more detail below, using exemplary embodiments and illustrations. In the figures.

DESCRIPTION OF THE EMBODIMENTS

Figure 1:
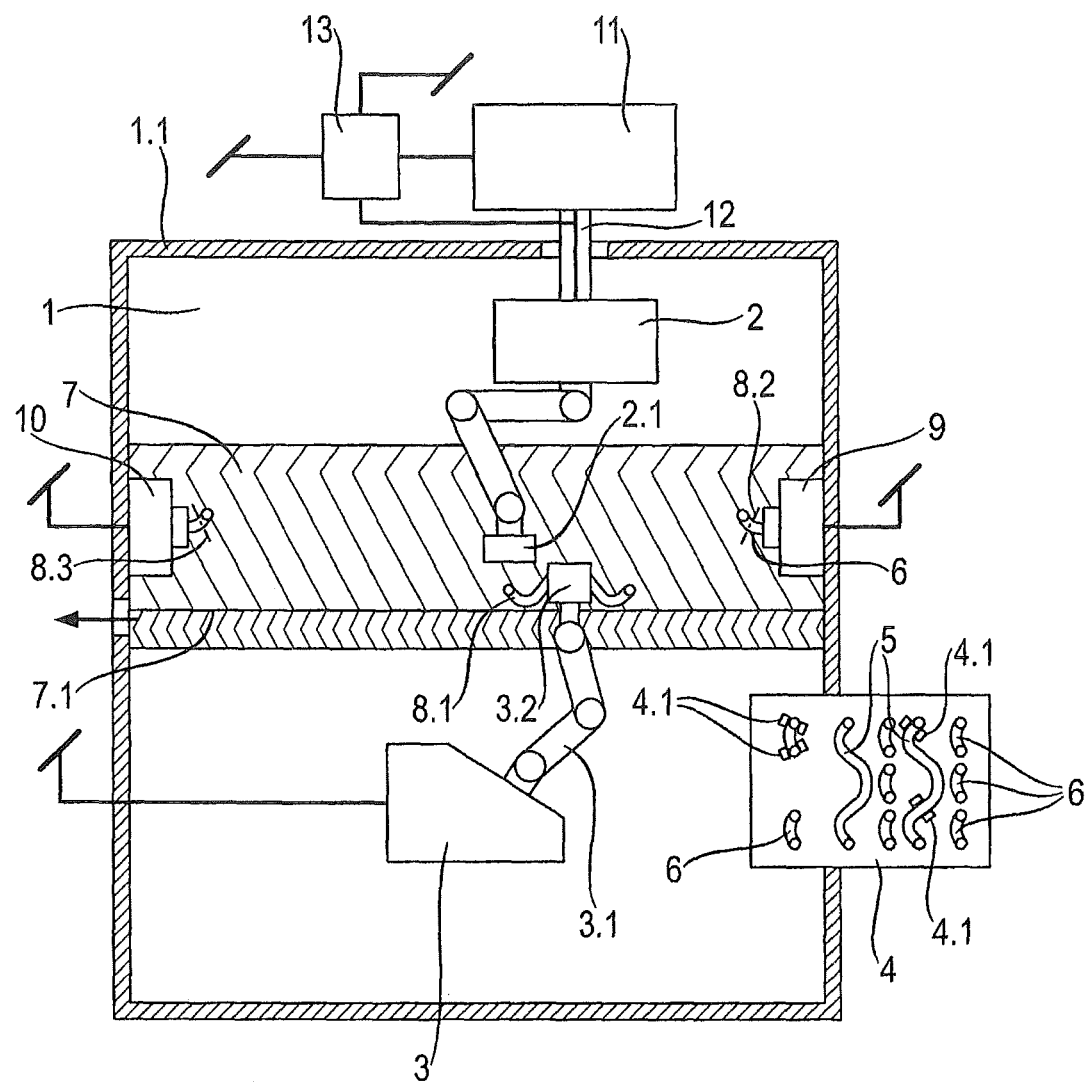
FIG. 1 shows a schematic representation in top view of a machining space with an embodiment of the device according to the invention in a first operating position.

An embodiment of the device according to the invention is illustrated in FIG. 1, whose essential elements are machining means 2 having a machining head 2.1, delivery means 3 having a gripping device 3.2, dispensing means 4 as well as a first clamping means 9 and a second clamping means 10.

The essential elements of the device are arranged in a machining space 1, whose wall 1.1 is designed such that the outward emergence of a laser beam is prevented. The delivery means 3 are designed as a robot gripper having a gripping arm 3.1 and the gripping device 3.2. The gripping arm 3.1 comprises a plurality of joints (sketched) and is moveable along all three spatial axes. The actually possible movements and working ranges of the delivery means create an access area of the delivery means 3 within which first and second workpieces 5, 6 can be gripped, retained and moved by the gripping device 3.2. In FIG. 1, the gripping arm 3.1 and the gripping device 3.2 are pointed towards the machining space 1. A first workpiece 5 is retained in the gripping device 3.2. Said first workpiece 5 is retained in the operating space 1 by the delivery means 3 such that it is only in contact with the gripping device 3.2 and that the first workpiece 5 is delivered to a first machining position 8.1 (indicated by a dotted line) such that a first machining line 14.1 (see FIG. 2) of the first workpiece 5 is placed on the first machining position 8.1. The first machining line 14 is a virtual line, along which the first workpiece 5 is to be cut by the machining head 2.1 by means of a laser beam (not shown). Since the first workpiece 5 is a bent pipe, the actual cut must obviously be carried out around the circumference of the first workpiece 5, wherein the first machining line 14.1 can be considered the projection of said cut.

The machining head 2.1 is delivered to the first machining position 8.1. Machining of the first workpiece 5 at the first machining position 8.1 is possible. The laser beam is provided by a laser source 11, which is arranged outside of the machining space 1. The laser beam is guided from the laser source 11 to the machining head 2.1 by a beam feed 12 in the form of a fiber optic cable, where it can be aimed at the first workpiece 5.

A first clamping means 9 and a second clamping means 10 are arranged on the wall 1.1 at approximately the horizontal height of the first machining position 8.1. Each of the clamping means 9, 10 comprise clamping tools (sketched only), with which a second workpiece 6 can in each case be retained. A second machining position 8.2 is defined by the first clamping means 9 and a third machining position 8.3 by the second clamping means 10.

A conveying belt as a conveying means 7, whose conveying direction (indicated by the arrow) points from the first clamping means 9 in the direction of the second clamping means 10, is provided below the first and second clamping means 9, 10 and the first machining position 8.1. The conveying belt has a V-shaped subsided design in the direction of conveyance. As a result, a conveying channel 7.1 is formed at the lowest point of the subsidence, said conveying channel running in the direction of conveyance. The asymmetrical design is illustrated in FIG. 1 by the asymmetrical location of the conveying channel 7.1. Due to the force of gravity, an object falling onto the conveying belt moves into the conveying channel 7.1 and can be transferred out of the machining space 1 from there through an opening in the wall 1.1. The conveying belt revolves within the machining space 1.

In further embodiments of the device according to the invention, the conveying means 7 can also have a symmetrical design. The conveying means 7 can also be guided through the opening in the wall 1.1.

The dispensing means 4 are arranged within an access area of the delivery means 3. Part of the expansion of said dispensing means extends into the machining space 1 through an opening (sketched) in the wall 1.1. The dispensing means 4 comprise mountings 4.1 (only some are shown), whose arrangement and dimensions are selected such that first workpieces 5 and second workpieces 6 can be retained in the mountings 4.1 in exactly known dispensing positions and spatial orientations (see description of FIG. 2).

Figure 2:
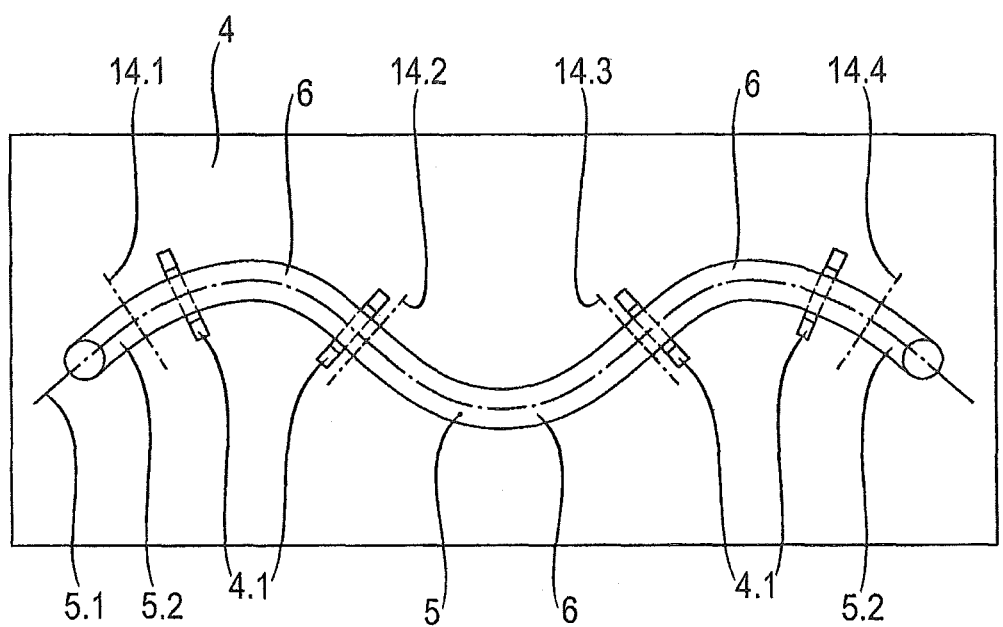
FIG. 2 shows a schematic representation of a dispensing means with a first workpiece.

One embodiment of the dispensing means 4 is illustrated in FIG. 2. The mountings 4.1 are designed as ridges with semi-circular retaining areas (not shown). The dimensioning of the retaining areas as well as the arrangement of the mountings 4.1 in regard to their respective position and orientation make it possible to place a first workpiece 5 into the mountings 4.1 in exactly only one dispensing position and with exactly one spatial orientation. The first workpiece 5 can be gripped for example in the area between the central mountings 4.1 by the gripping device 3.2 (see FIGS. 1 and 3).

The first workpiece 5 is a semi-finished product in the shape of a bent pipe. It does not have a rotationally symmetrical design, i.e., it cannot be rotated in a rotationally symmetrical way around its center axis 5.1. The first workpiece 5 is only bent two-dimensionally in one plane, in which the center axis 5.1 is also positioned. Perpendicular to said plane, the first workpiece 5 in each case only juts out with half of its cross-section.

In further embodiments of the dispensing means 4, the mountings 4.1 can also be designed such that three dimensionally formed, e.g. bent, pressed, injection molded or cast first workpieces 5 can be picked up and retained in exactly one dispensing position and with known spatial orientation.

Machining lines 14.1 to 14.4 are shown for clarification purposes, along which the first workpiece 5 is later supposed to be cut using the laser beam. One edge piece 5.2 each will be created on either end of the first workpiece 5. The remaining length of the first workpiece 5 is divided into three segments by two other machining lines 14.2 and 14.3, said segments can be transferred out of the device as second workpieces 6 and machined further after the segments have been cut off.

Figure 3:
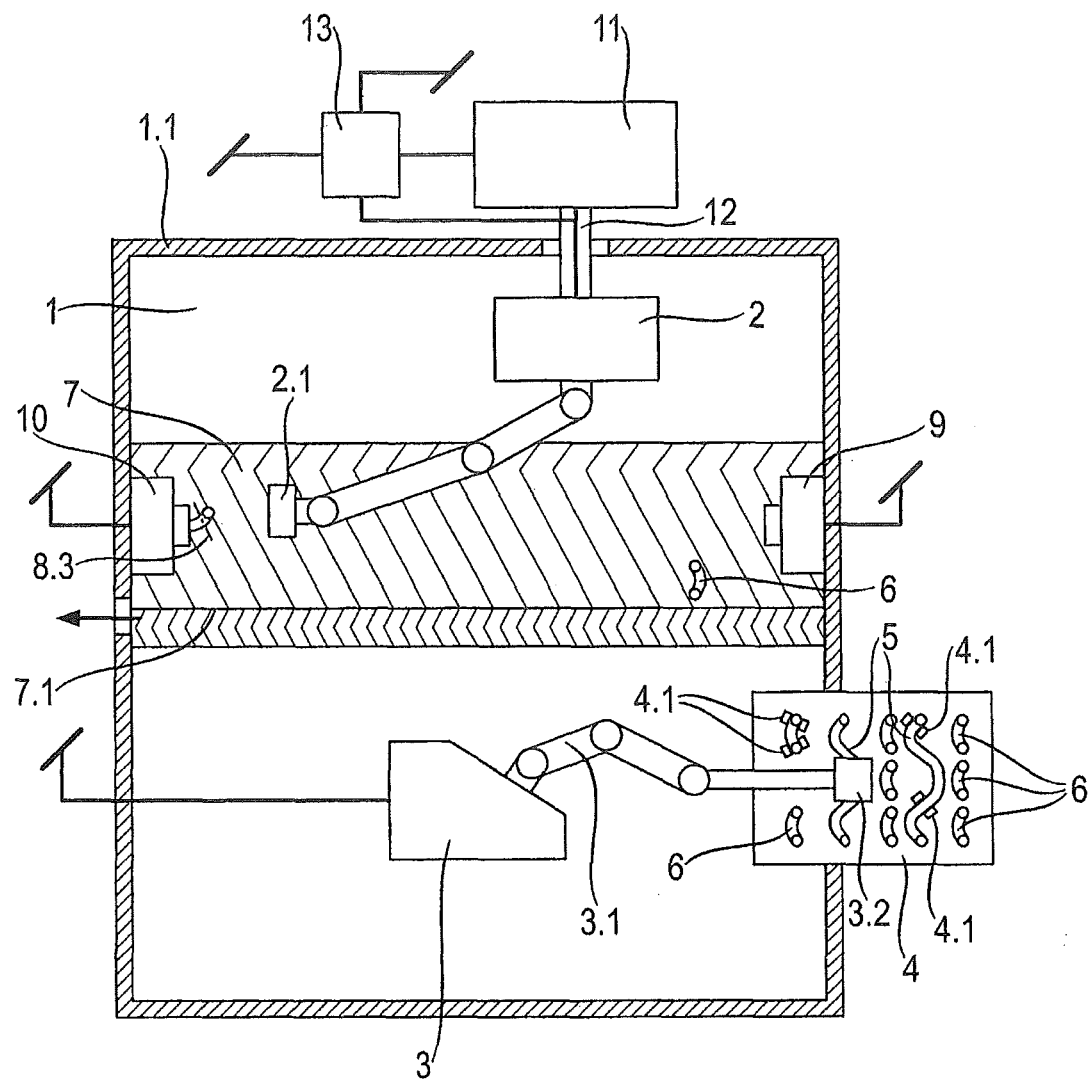
FIG. 3 shows a schematic representation in top view of a machining space with the embodiment of the device according to the invention in a second operating position.

FIG. 3 corresponds to FIG. 1 with all the shown elements. An operating status of the device is illustrated, in which a first workpiece 5 provided on the dispensing means 4 is gripped by the delivery means 3. A second workpiece 6, which was retained at the first clamping means 9, was machined by the machining means 2. The machined second workpiece 6 has been released by the first clamping means 9 and is on the conveying means 7. The machining head 2.1 is delivered to the third machining position 8.3.

All of said elements are controllable by means of a control system 13, which is connected with the laser source 11, with the delivery means 3, the machining means 2 and the clamping means 9, 10 and their current operating statuses can be adjusted to each other.

An attempt is made to explain a possible variant of the embodiment of the method according to the invention by means of FIGS. 1 and 2. In a first step, first and second workpieces 5, 6 on the dispensing means 4 are placed into the corresponding mountings 4.1, such that they in each case comprise a unique dispensing position and spatial orientation. A second workpiece 6 is gripped by the delivery means 3 by means of the gripping arm 3.1 and the gripping device 3.2 and delivered to the second clamping means 9 and retained by the second clamping means 9. Next, a second workpiece 6 is gripped again and delivered to and retained by the second clamping means 10. During this time, the machining head 2.1 is at a position, which prevents a collision with the gripping arm 3.1 and the gripping device 3.2. A first workpiece 5 is now gripped from the dispensing means 4 by the delivery means 3. Since the first workpiece 5 is known in its dispensing position and spatial orientation and the first workpiece 5 is gripped at a known area of the first workpiece and from a known, predefined direction by means of the gripping device 3.2, a known relative location is likewise created between the gripping device and the workpiece 5. The second workpiece 5 is delivered to the first machining position 8.1 and retained freely in space. In so doing, the relative location between the gripping device 3.2 and the first workpiece 5 is not changed. As a result, a relative location between the first workpiece 5, the machining lines 14 of the first workpiece 5 and the first machining position 8.1 is also known. The first workpiece 5 is retained by the gripping device 3.2 such that a first machining line 14.1 is present at the first machining position 8.1. After the machining head 2.1 is delivered to the first machining position 8.1, said machining head follows the first machining line 14.1 with the laser beam and cuts off the one edge piece 5.2 from the first workpiece 5. In so doing, the machining head 2.1 follows slightly more than half the distance of the first machining line 14.1 in one direction. Next, the first machining line 14.1 is followed in the other direction across approximately half the distance of the first machining line 14.1, wherein the two distance crossings overlap such that a complete separation of the one edge piece 5.2 from the first workpiece 5 is achieved. The edge piece 5.2 drops onto the conveying means 7, is moved into the conveying channel 7.1 by the force of gravity and transferred out of the machining space 1. Next, the position of the gripping device 3.2 is changed such that the second machining line 14.2 is delivered to the first machining position 8.1. The cutting process is repeated and a second workpiece 6 is cut off as a segment of the first workpiece 5. Said second workpiece 6 is likewise transferred out of the machining space 1 and machined further outside the machining space 1. The further machined second workpiece 6 is placed back into the dispensing means 4 by way of a not illustrated mechanism.

The cutting of the first workpiece 5 is repeated for as long until all machining lines 14.1 to 14.4 have been followed completely. In so doing, the gripping device 3.2 is rotated by 180 degrees for the delivery of the machining lines 14.3 and 14.4, such that the machining head 2.1 can remain at the first machining position 8.1. Once all steps have been completed, the gripping device 3.2 releases the still retained segment of the first workpiece 5 and said segment drops onto the conveying means 7.

Next, a first workpiece 5 on the dispensing means 4 is gripped again by the delivery means and delivered to the first machining position 8.1. In the meantime, the machining head 2.1 is delivered to the second machining position 8.2, where it machines the second workpiece 6 that is present there. After the machining is complete, the machined second workpiece 6 is released from the first clamping means 9 and drops onto the conveying means 7.

The machining head 2.1 is delivered to the first machining position 8.1 again and the first workpiece 5 present there is machined. While a first workpiece 5 is gripped anew from the dispensing means 4 by the delivery means 3, the machining head 2.1 is delivered to the third machining position 8.3 where it machines the second workpiece 6 that is present there. Then a first workpiece 5 is machined again, as described above. After said machining, no second workpieces 6 are present any more at the second and third machining position 8.2, 8.3. Now, the delivery means 3 again deliver a second workpiece 6 each to the second and third machining position 8.2, 8.3. The machining head 2.1 remains idle during this time.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE NUMBERS

1 Machining space
1.1 Wall (of the machining space)
2 Machining means
2.1 Machining head
3 Delivery means
3.1 Gripping arm
3.2 Gripping device
4 Dispensing means
4.1 Mounting
5 First workpiece
5.1 Center axis
5.2 Edge piece
6 Second workpiece
7 Conveying means
7.1 Conveying channel
8.1 First machining position
8.2 Second machining position
8.3 Third machining position
9 First clamping means
10 Second clamping means
11 Laser source
12 Beam feed
13 Control system
14 Machining line

What is claimed is:

1. A device for machining workpieces by means of a laser beam, comprising a delivery means for delivering the workpieces to a first machining position, machining means having at least one machining head for machining a workpiece delivered to the first machining position, said delivery means being a robot gripper having a gripping device, said machining head being movable by at least three degrees of freedom, a dispensing device having mountings arranged in an access area of the delivery means, the design and dimensioning of the mountings being selected such that at least one workpiece retained in the mountings with a defined spatial orientation and position of the delivery means is provided for removal from the mountings, at least one clamping means for retaining a workpiece delivered by the delivery means is arranged, wherein each clamping means in each case defines one machining position, and said machining head arranged to be delivered to each machining position for machining the workpiece.

2. The device according to claim 1, wherein said first machining position is specified by a defined spatial orientation and position of the gripping device.

3. Use of a device according to claim 1 for machining non-rotationally symmetrical workpieces by means of a laser beam.

4. A method for machining three-dimensional, non-rotationally symmetrical workpieces by means of a laser beam, comprising the steps:
   a) providing a semi-finished product as a first workpiece having a defined spatial orientation and dispensing position;
   b) gripping the first workpiece by means of a gripping device of a delivery means;
   c) delivering the first workpiece to a first machining position by means of the gripping device, wherein the first workpiece is retained freely in space;
   d) delivering a machining head of a machining means to the first machining position and machining of the first workpiece, wherein steps c) and d) can be carried out multiple times;
   e) releasing the machined first workpiece;
   f) providing at least one second workpiece in a defined spatial orientation and dispensing position;
   g) gripping of the second workpiece and delivering the second workpiece to a further machining position by means of the gripping device, wherein the second workpiece is retained at the further machining position by means of a clamping means,
   h) delivering the machining head to the further machining position and machining of the second workpiece, and
   i) releasing the machined second workpiece.

5. A method according to claim 4, wherein steps h) and i) are carried out simultaneously with the steps a) to c).

* * * * *